No. 626,602. Patented June 6, 1899.
J. T. FENTON.
BICYCLE HANDLE BAR.
(Application filed Oct. 23, 1897. Renewed Mar. 10, 1899.)
(No Model.) 2 Sheets—Sheet 1.
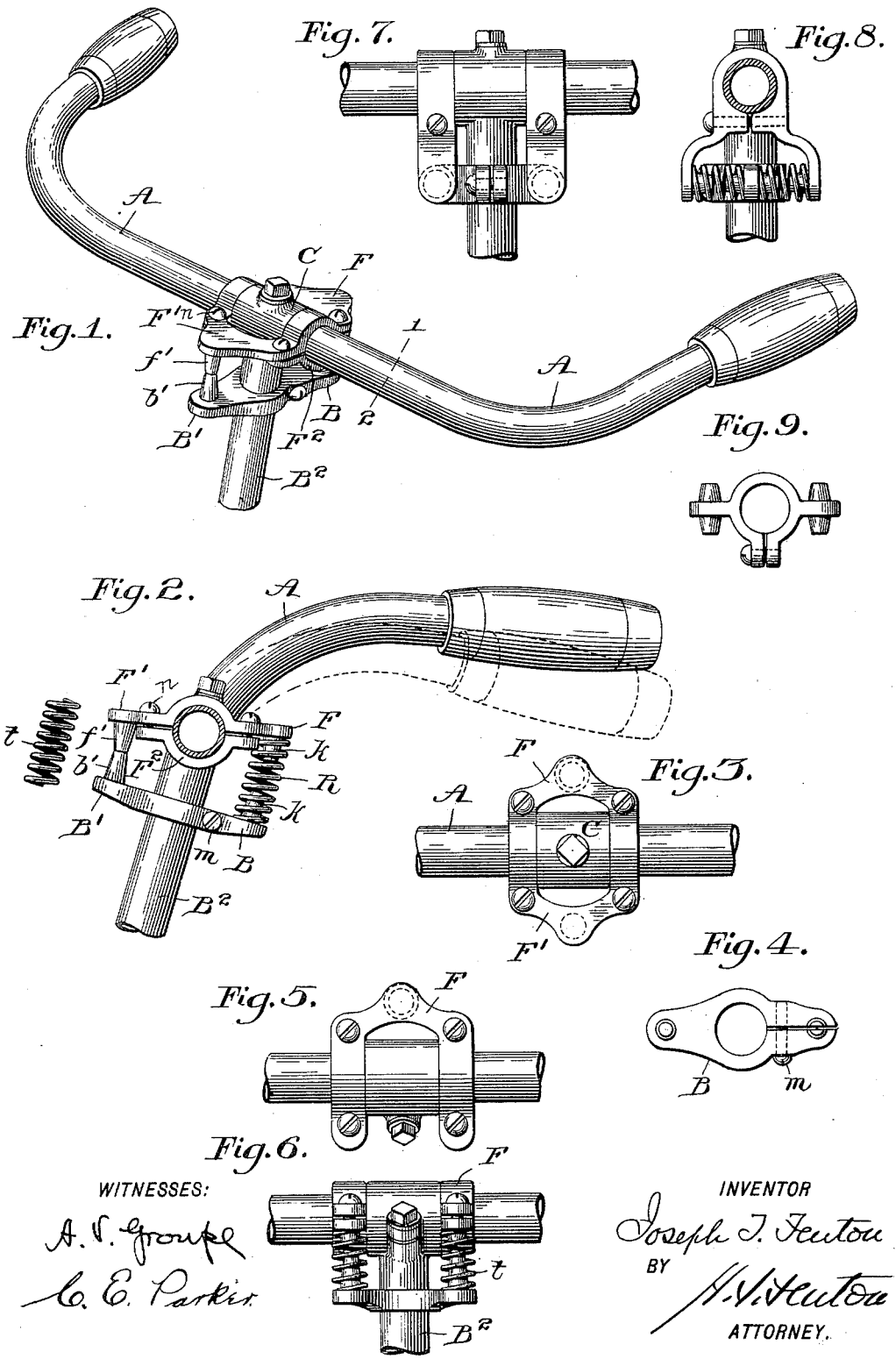
WITNESSES:
A. S. Groupel
C. E. Parker
INVENTOR
Joseph T. Fenton
BY
H. V. Fenton
ATTORNEY.
THE NORRIS PETERS CO., PHOTO-LITHO., WASHINGTON, D. C.

No. 626,602. Patented June 6, 1899.
J. T. FENTON.
BICYCLE HANDLE BAR.
(Application filed Oct. 23, 1897. Renewed Mar. 10, 1899.)

(No Model.) 2 Sheets—Sheet 2.

WITNESSES:
A. V. Groupp
C. E. Parker

INVENTOR
Joseph T. Fenton
BY
F. V. Fenton
ATTORNEY.

UNITED STATES PATENT OFFICE.

JOSEPH T. FENTON, OF PHILADELPHIA, PENNSYLVANIA.

BICYCLE HANDLE-BAR.

SPECIFICATION forming part of Letters Patent No. 626,602, dated June 6, 1899.

Application filed October 23, 1897. Renewed March 10, 1899. Serial No. 708,594. (No model.)

*To all whom it may concern:*

Be it known that I, JOSEPH T. FENTON, a citizen of the United States, residing in the city of Philadelphia, in the State of Pennsylvania, have invented certain new and useful Improvements in Bicycle Handle-Bars, of which the following is a full, clear, and exact description, reference being had to the accompanying drawings, forming a part of this specification.

My invention relates to bicycle handle-bars, and has for its object to provide resilient means for taking up the vibration conveyed by the wheels through the frame to the usually rigid handle-bar.

To this end my invention consists, broadly, of the combination, with a pair of handle-bars which are rotatable relatively to the post on which they are mounted, of resilient means between said parts adapted to take up the vibration imparted to the post and which would otherwise be conveyed to the handle-bars, such means being combined with means to limit the arc of rotation of the handle-bars in both directions.

Figure 10:
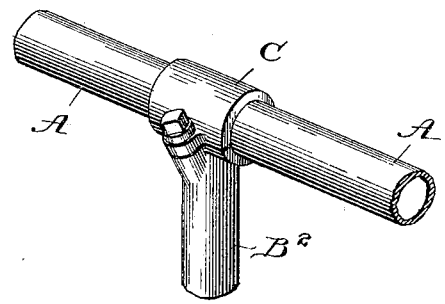
Figure 11:
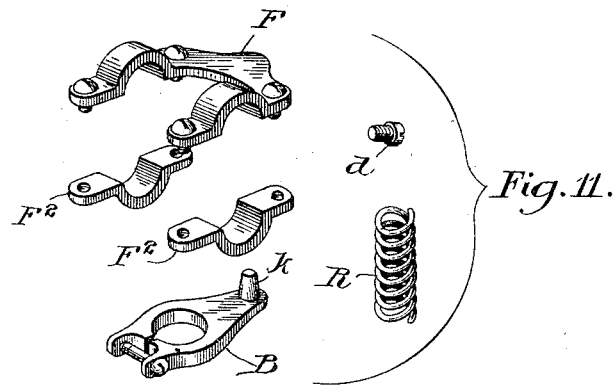
Figure 12:
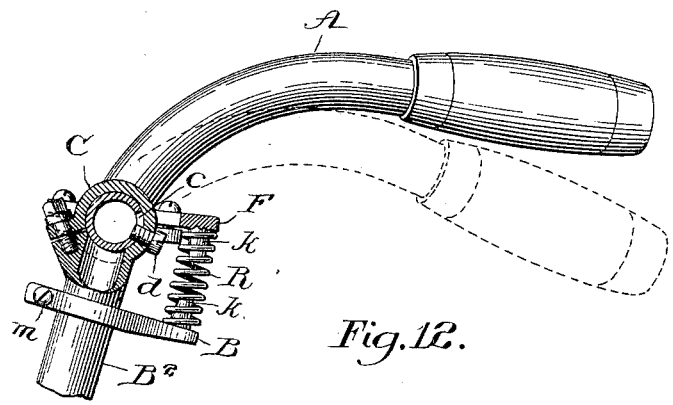

In the accompanying drawings, illustrating my invention, in which similar letters of reference indicate like parts in the several views, Figure 1 is a perspective view from the front of the wheel. Fig. 2 is a side elevation, with the handle-bar in section, on the line 1 2 of Fig. 1. Fig. 3 is a plan view of the part shown in Fig. 1. Fig. 4 is a plan view of the clamp B of Fig. 2. Fig. 5 is a plan view, and Fig. 6 a front view, of a modification. Fig. 7 is a plan view, Fig. 8 a side view, partly in section, and Fig. 9 a detached plan view, of another modification. On Sheet 2 of the drawings Fig. 10 is a perspective view of a pair of handle-bars clamped on the post on which they are mounted as now ordinarily constructed. Fig. 12 is a side view of the same with my improvements applied thereto, showing another form of the means to limit the upward movement of the handle-bars in the arc of rotation; and Fig. 11 is a side elevation thereof removed from the handle-bars and their supporting-post.

Referring to the drawings, Fig. 10, Sheet 2, illustrates a pair of bicycle handle-bars A A, which are shown integrally constructed and mounted upon the usual handle-bar post $B^2$ by means of the usual clamp C, which forms a part thereof.

The post $B^2$ is hollow for a part of its length, and hence is vertically adjustable relatively to the frame of the vehicle. The handle-bars are externally screw-threaded for a part of their length to fit the internal screw-threads on the clamp C. It will be observed that when the clamp C is loosened the handle-bars are rotatable relatively to their supporting-post. The object of so mounting the bars is to adjust the bars at any angle relatively to the plane of the wheel. In bars of this construction as commonly employed the clamp C is again fastened tight after the bars have been adjusted to the desired angle. So far as described the construction is as usual, and to such rotatable handle-bars my invention, hereinafter described, is applicable.

In the employment of such construction of handle-bars and supporting-post as the foundation element to which my improvement is applicable the clamp is not to be adjusted so tight on the bar as to prevent its rotation therein; but, on the contrary, it is to be sufficiently loose to permit such rotation, and my invention primarily consists of means to limit this arc of rotation, and, secondarily, of resilient means against which the rotatable handle-bar in this vibratory motion in either one or both directions exerts a pressure.

Means to limit the arc of rotation of the handle-bars in an upward direction are shown in the drawings in two forms, one of them being as shown in Fig. 12, in which the clamp C of the post is shown tapped out at $c$ with a long enough tap or slot to permit of the rotation desired, and through this slot is inserted a stop-pin $d$, inserted into a screw-hole tapped in the periphery of the handle-bar. Obviously the play of the pin $d$ in the long slot $c$ will limit the rotation of the bars in both directions, although its essential function is to limit the upward throw only. In Figs. 1 and 2 of the drawings the clamp-plates B and F, hereinafter described, are shown provided with extension-pieces B' and F', projecting forward on the front side of the handle-bars, and these extension-pieces B' and F' are provided with lugs $b'$ and $f'$, extending inwardly and toward each other, so that when the handle-bars (to which the clamp-plates B and F are secured) are rotated the length of such rotation in an upward direction is controlled and limited by the normal distance between the lugs $b'$ and $f'$.

In Figs. 5 and 6 the top clamp-plate F is shown divided at the front or forked, so that instead of a single front extension-piece F' there are two and a corresponding doubling of the lugs. In Figs. 7 and 8 is shown the same function and effect by a lateral arrangement of the parts, the latter comprising the resilient devices hereinafter described.

In applying my invention I construct a clamp-plate B (see Figs. 1 and 2) to be secured adjustably on the post $B^2$ by means of the screw $m$. This clamp-plate is shown in plan view in Fig. 4. Obviously it can be moved up and down on the post-bar $B^2$ and adjusted at any desired point thereon. Such adjustment will control and regulate the arc of rotation of the handle-bars in a downward direction. A clamp-plate F (shown in plan view in Fig. 3) is secured rigidly on the handle-bars and rigidly on the under plate $F^2$ by screwing it, such as by means of screws $n$. This clamp-plate F is provided with downwardly-projecting lugs $k$, and the lower clamp-plate B is provided with like lugs $k$, projecting upwardly. These are adapted to contact on the downward movement of the handle-bars in the aforesaid arc of rotation. A coiled spring R, exerting an outward tension, is placed around these lugs $k$, and the tendency thereof is to keep the plates F and B apart as far as the stop devices shown in Fig. 12 or its equivalent shown in the other figures will permit, and as the lower clamp-plate B is fixed and always at a right angle to the post-bar and the upper clamp F is rotatable the normal position of the latter will always be as shown in side elevation in Fig. 2—that is to say, elevated in the rear to the extent of the limit of the arc of rotation in an upward direction. In order to supply resilient devices against any shock arising from sudden contact of the front lugs $b'$ and $f'$, there is provided a coiled spring $t$, mounted around such lugs and between the plates F' and B', (see Fig. 2;) but this spring, which also exerts an outward tension, must be smaller and exert less tension than the rear spring, so that the latter will always be able to maintain the clamp-plates B and F normally in the relative positions shown in Fig. 2.

The operation of the device will be apparent from the description—that is to say, the handle-bars grasped by the rider being rotatable within certain limits any vibration imparted while riding over rough surfaces to the post $B^2$ will not be conveyed to the handle-bars, but will be taken up by the described intermediate resilient mechanism arranged between the clamp-plates B and F on the handle-bars and post-bar, respectively.

Having thus described my invention, what I claim as new, and desire to secure by Letters Patent, is—

1. The combination with the upright post $B^2$ having a transverse sleeve-like clamp or arm C, and a pair of handle-bars mounted rotatably therein, of a pair of clamping-plates F and $F^2$ adapted to be rigidly fixed to the handle-bars on each side of the sleeve-like arm C, and resilient spring mechanism arranged between and adapted to exert a normally-outward pressure against the bearings therefor secured to the post and against the clamp-plates F, $F^2$ secured to the handle-bars; substantially as described.

2. In combination with a pair of handle-bars which are vertically rotatable relatively to the post on which they are mounted, and with means to limit said rotation in an upward direction, of a pair of clamp-plates F and $F^2$ rigidly fixed on the handle-bars, and a lower adjustable clamp-plate B adapted to be rigidly fixed at any desired height on the post $B^2$, lugs on the clamp-plates F and B opposite each other, and an outwardly-pressing spring between the clamp-plates; substantially as described.

3. In combination with a pair of handle-bars which are vertically rotatable relatively to the post on which they are mounted, of a pair of clamp-plates F, $F^2$ rigidly clamped on the handle-bars, said plate F having a front extension-piece F', a lower adjustable clamp-plate B secured to the post $B^2$ and having a front extension-piece B', front and back lugs between the clamp-plates F and B and between their extension-pieces F' and B' and outwardly-pressing springs between the same, the back spring being relatively of greater tension than the front spring, whereby the handle-bars are always maintained normally at the extreme limit of their arc of rotation in an upward direction; substantially as described.

In testimony whereof I have hereunto affixed my signature this 20th day of October, A. D. 1897.

JOSEPH T. FENTON.

Witnesses:
WALTER C. PUSEY,
H. T. FENTON.